UNITED STATES PATENT OFFICE 2,647,121

DIAMINE-BIS-ACETAMIDES

Arthur L. Jacoby, deceased, late of Western Springs, Ill., by Ruth P. Jacoby, executrix, Western Springs, Ill., assignor to National Aluminate Corporation, Chicago, Ill., a corporation of Delaware No Drawing. Application February 2, 1951,
Serial No. 209,204

10 Claims. (Cl. 260—268)

This invention relates to high molecular weight N,N'-disubstituted diamides of complex dibasic acids, and more specifically to new chemical compounds of that character having the general formula:

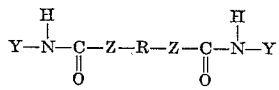

wherein Y is an alkyl group containing 12 to 18 carbon atoms inclusive; Z is a divalent hydrocarbon radical from the group consisting of phenylene and alkylene groups having 1 to 4 carbon atoms inclusive; and R is a polyamine group having valence bonds from terminal nitrogen atoms thereof connected to the radicals Z,Z.

The foregoing formula can also be written

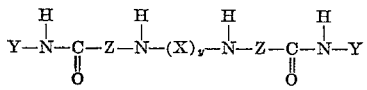

wherein Y and Z have the foregoing significance, X is the residue of an organic polyamine, e. g., phenylene, alkylene, and polyalkylene polyamino, and $y$ is zero or one.

The compounds of this invention, when conforming to certain structural limitations, as more fully set forth hereinafter, are greases or waxes of varying degrees of hardness and are valuable as substitutes for natural waxes, as constituents of coating compositions, as corrosion inhibitors, as defoamers, and as intermediates for the preparation of other valuable compounds.

An example of a compound represented by the above formula is N,N'-diethylenetriaminobis-N-octadecylacetamide, obtained by the reaction of two mols of N-octadecylchloroacetamide and one of diethylenetriamine according to the following equation:

of the organic polyamine, the residue of which is represented by X in the formula, may be varied considerably. Thus, coupling has been effected by means of such amines as hydrazine, piperazine, the polyalkylenepolyamines, alkylenediamines, and the phenylenediamines, yielding efficient products in every case. Obviously, in the case where hydrazine is the coupling agent, the (X) of the general formula will be absent, i. e., $y$ will be zero.

The simplest method of manufacturing the materials of this invention involves the initial formation of the N-alkylated amide of the halogeno-acid by merely heating the desired amine with the halogeno-acid (or corresponding acid halide), and the subsequent coupling of the product by introducing the polyamine and heating at an elevated temperature, preferably at least 150° C., until the halogen groups of the halogeno-acid have been aminated. The hydrogen halide is then eliminated by neutralizing with an alkali such as, for example, sodium hydroxide, potassium hydroxide, ammonia and sodium carbonate. The intermediate salts obtained before neutralization may be added as such to alkaline waters such as boiler waters where they are converted to the free polyamides which are substantially insoluble. In other words, the alkali present in the water functions as a neutralizing agent so that the relatively soluble salt is converted to an insoluble amide. This method is illustrated in the following examples of the preparation of valuable materials, but it is to be understood that it is not wished to be limited by the examples.

Example I

A mixture of 13.6 grams (0.04 mol) of N-octadecylchloroacetamide and 2.1 grams (0.02 mol) of diethylenetriamine was stirred 2 hours at 150 to 160 degrees C. The product was neutralized

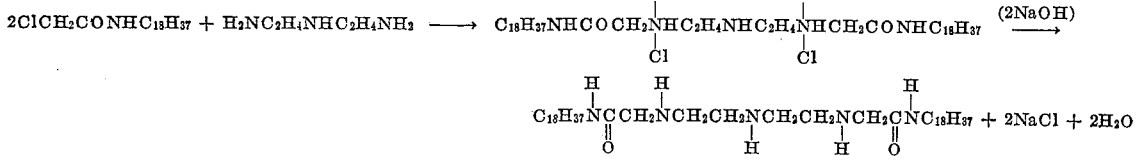

The preferred compounds of this invention are those wherein the alkyl groups, Y, of the formula contain at least about 14 carbon atoms each but the radicals Z may be varied within wide limits, such halogeno-acids as chloroacetic, betachlorobutyric, and o-iodobenzoic being all suitable as starting materials in the preparation of the N-alkylated amides. Furthermore, the nature by adding 2.0 grams of sodium hydroxide in 10 cc. of water.

Example II

A mixture of 12 grams (0.033 mol) of N-octadecylchloroacetamide and 2 grams (0.016 mol) of 40% aqueous hydrazine hydrate was stirred for 3 hours at 150 to 160 degrees C., after a brief initial period at a lower temperature to prevent excessive frothing. The product was neutralized by adding 1.5 grams of sodium hydroxide in 10 cc. of water.

*Example III*

To 0.05 mol of N-octadecylchloroacetamide at 150 to 160 degrees C., 2.2 grams (0.025 mol) of 68% aqueous ethylenediamine was added dropwise with stirring, and stirring and heating continued 3 hours. The product was neutralized by adding 2.5 grams of sodium hydroxide in 10 cc. of water.

*Example IV*

To 0.05 mol of N-octadecylchloroacetamide at 150 to 160 degrees C., 5 grams (0.025 mol) of piperazine hexahydrate was added with stirring, and the stirring and heating continued for 2 hours. The product was neutralized by adding 2.5 grams of sodium hydroxide in 10 cc. of water.

*Example V*

To 0.05 mol of N-octadecylchloroacetamide at 150 to 160 degrees C. was added 2.7 grams (0.025 mol) of m-phenylenediamine with stirring, and stirring and heating were then continued 2 hours longer. The product was neutralized by adding 2.5 grams of sodium hydroxide in 10 cc. of water.

*Example VI*

To 0.05 mol of N-octadecylchoroacetamide at 150 to 160 degrees C. was added 3.7 grams (0.025 mol) of triethylenetetramine with stirring, and stirring at 150 to 160 degrees C. was then continued 2 hours longer. The product was neutralized by adding 2.5 grams of sodium hydroxide in 10 cc. of water.

*Example VII*

To 0.05 mol of N-octadecylchloroacetamide at 150 to 160 degrees C. was added with stirring, dropwise and simultaneously, 3 grams (0.03 mol) of ethylene dichloride and 3 grams (0.03 mol) of diethylenetriamine. The mixture was then stirred at 150 to 160 degrees C. for 2 hours longer. It is believed that by this procedure, two molecules of the alkylated chloroacetamide are joined through an amine-containing linkage represented by a large polyalkylenepolyamine. The product was neutralized by adding 5.0 grams of sodium hydroxide in 10 cc. of water.

*Example VIII*

To 0.005 mol of N-tetradecylchloroacetamide at 150 to 160 degrees C. was added 0.26 grams (0.0025 mol) of diethylenetriamine, with stirring, and then stirring at 150 to 160 degrees C. was continued 2 hours longer. The product was neutralized by adding .25 gram of sodium hydroxide in 10 cc. of water.

*Example IX*

A mixture of 2.5 grams of beta-chlorobutyric acid and 6.34 grams of octadecylamine (with a mean molecular weight of 264) was stirred 2 hours at 150 to 160 degrees C. Then 1.4 cc. of diethylenetriamine was added and the mixture stirred 3 hours longer at 150 to 160 degrees C. The product was neutralized by adding 1.0 gram of sodium hydroxide in 10 cc. of water.

*Example X*

A mixture of 5 grams of beta-chloropropionyl chloride and 6.7 grams of octadecylamine (with a mean molecular weight of 264) was made at room temperature, and quickly warmed itself to a homogeneous liquid mass, which was gradually heated, with stirring, to 150 degrees C. Then 1.4 cc. of diethylenetriamine was added and the mixture stirred 3 hours at 150 to 160 degrees C. The product was neutralized by adding to the resultant mixture 1.7 grams of sodium hydroxide in 10 cc. of water.

*Example XI*

10.6 grams of octadecylamine (having a mean molecular weight of 264) was added portion-wise to a belt of 10.7 grams of o-iodobenzoyl chloride, and the mixture brought to 150 degrees C. with stirring. Then 2.16 cc. of diethylenetriamine was added and the mixture stirred 2 hours at 150 to 160 degrees C. The product was neutralized by adding to the resultant mixture 1.7 grams of sodium hydroxide in 10 cc. of water.

In a similar manner, other polyamides falling within the general formula may be derived by the reaction of one mol of a halogeno organic acid or acid chloride with one mol of a primary or secondary organic mono-amine followed by reaction of two mols of the resultant product with one mol of an organic polyamine containing primary or secondary amino groups followed by neutralization. For example, by following the teachings of the invention alpha,alpha'-[iminobis(propyleneimino)]bis[N-hexadecylacetamide] was prepared from chloroacetyl chloride, N-hexadecylamine and dipropylene triamine with the elimination and neutralization of hydrogen chloride. Similarly, beta,beta'-[iminobis(propyleneimino)] bis(N-lauryl propionylamide) was prepared from beta propionylchloride, normal laurylamine and dipropylenetriamine with the elimination and neutralization of hydrogen chloride.

The term "polyalkylene" as used herein refers to a radical or group characterized by two or more alkylene groups as in piperazine. The term "polyalkylene polyamine" refers to a group or radical characterized by at least two amino groups and by an amino nitrogen atom between two alkylene groups as in diethylene triamine, triethylene tetramine, tetraethylene pentamine, dipropylene triamine and homologues thereof.

The present application is a continuation-in-part of copending applications Serial No. 459,014, filed September 19, 1942, now matured into U. S. Patent 2,580,922, and Serial No. 50,663, filed September 22, 1948, which became abandoned after the filing of this application.

The invention is hereby claimed as follows:

1. A water insoluble compound having the following structural formula $$Y-N(H)-C(=O)-Z-R-Z-C(=O)-N(H)-Y$$

wherein Y is an alkyl group containing 12 to 18 carbon atoms; Z is a divalent hydrocarbon radical from the group consisting of phenylene and alkylene groups having one to four carbon atoms inclusive, and R is a bivalent polyamino group from the group consisting of

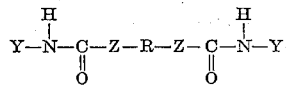

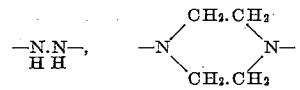

monoalkylene diamino in which the alkylene group contains at least 2 carbon atoms, polyalkylene polyamino containing at least two alkylene groups of at least two carbon atoms each and at least three nitrogen atoms, and phenylene diamino, having valence bonds from nitrogen atoms thereof connected to the radicals Z,Z.

2. A water insoluble compound having the following structural formula

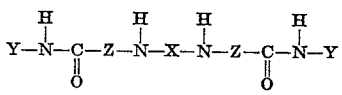

wherein Y is an alkyl group containing 12 to 18 carbon atoms; Z is an alkylene group containing 1 to 4 carbon atoms inclusive, and X is an alkylene group containing at least 2 carbon atoms.

3. A water insoluble compound having the following structural formula

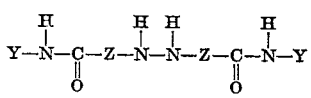

wherein Y is an alkyl group containing 12 to 18 carbon atoms, and Z is an alkylene group containing 1 to 4 carbon atoms.

4. A water insoluble compound having the following structural formula

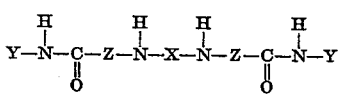

wherein Y is an alkyl group containing 12 to 18 carbon atoms, Z is an alkylene group containing 1 to 4 carbon atoms inclusive, and X is a polyethylene polyamino group.

5. A water insoluble compound having the following structural formula

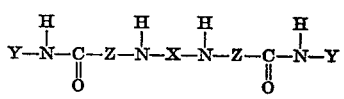

wherein Y is an alkyl group containing 12 to 18 carbon atoms, Z is an alkylene group containing 1 to 4 carbon atoms, and X is phenylene.

6. A water insoluble compound having the following structural formula

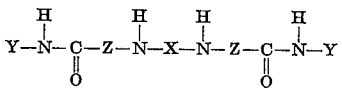

wherein Y is an alkyl group containing 12 to 18 carbon atoms, Z is an alkylene group containing 1 to 4 carbon atoms, and X is

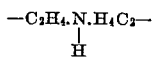

7. A water insoluble compound having the following structural formula

wherein Y is an alkyl group containing 12 to 18 carbon atoms.

8. The compound having the following structural formula

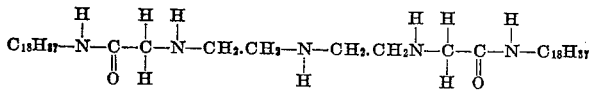

9. The compound having the following structural formula

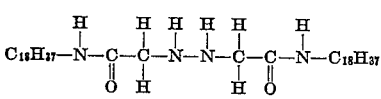

10. The compound having the following structural formula

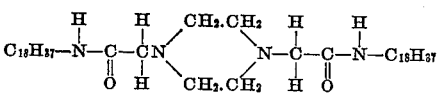

RUTH P. JACOBY,
*Executrix of the last will and testament of Arthur L. Jacoby, deceased.*

References Cited in the file of this patent

UNITED STATES PATENTS

| Number | Name | Date |
|---|---|---|
| 2,087,565 | Balle et al. | July 20, 1937 |
| 2,168,253 | Balle et al. | Aug. 1, 1939 |
| 2,191,978 | Balle et al. | Feb. 27, 1940 |
| 2,388,154 | Katzman | Oct. 30, 1945 |
| 2,420,122 | Chenicek | May 6, 1947 |
| 2,480,439 | Bersworth | Aug. 30, 1949 |